United States Patent [19]

Tenhengel

[11] Patent Number: 4,669,497

[45] Date of Patent: Jun. 2, 1987

[54] BACKFLOW PREVENTING DEVICE

[75] Inventor: Edwin L. Tenhengel, Matthews, N.C.

[73] Assignee: Conbraco Industries, Inc., Matthews, N.C.

[21] Appl. No.: 828,963

[22] Filed: Feb. 11, 1986

[51] Int. Cl.[4] ............................................. F16K 24/02
[52] U.S. Cl. ...................................... 137/218; 137/102
[58] Field of Search ................................. 137/102, 218

[56] References Cited

U.S. PATENT DOCUMENTS

| 2,646,063 | 7/1953 | Hayes | 137/218 |
|---|---|---|---|
| 2,997,054 | 8/1961 | Woodford | 137/218 |
| 3,023,767 | 3/1962 | Woodford | 137/218 |
| 3,034,527 | 5/1962 | Hennells | 137/102 |
| 3,155,107 | 11/1964 | Woodford | 137/218 |
| 3,183,924 | 5/1965 | Duchin | 137/218 |
| 3,207,171 | 9/1965 | Kryman | 137/218 |
| 3,543,786 | 12/1970 | Woodford | 137/218 |
| 4,064,896 | 12/1977 | Trenary | 137/218 |

Primary Examiner—Gerald A. Michalsky
Attorney, Agent, or Firm—Shefte, Pinckney & Sawyer

[57] ABSTRACT

A hose connection vacuum breaker backflow preventing device for installation on the discharge nozzle of a water faucet for preventing reverse water flow into the faucet which may possibly contaminate the water supply. The device includes a unitary tubular body defining an unobstructed passageway with threaded female inlet and male outlet connections at opposite ends thereof. An integral shoulder is formed interiorly of the passageway and a pair of exhaust ports open radially outwardly through the body from the passageway upstream of the shoulder. A valve assembly within the passageway is spring-biased into a seated position closing communication between the inlet and outlet ends of the passageway while permitting fluid communication between the outlet end and the ports for draining any reverse water flow. The valve assembly is yieldable to an operating position under the force of pressurized fluid flow into the inlet passageway end to open communication with the outlet passageway end, while a resilient valve washer contacts the interior shoulder to close communication between the passageway and the ports to prevent water leakage.

4 Claims, 4 Drawing Figures (4,669,497)

BACKFLOW PREVENTING DEVICE

BACKGROUND OF THE INVENTION

The present invention relates to backflow preventing devices for installation in a pressurized fluid flow system for preventing reverse flow of fluid through the system and, more particularly, relates to such devices of the type commonly referred to as hose connection vacuum breakers.

Over recent years, there has been significantly mounting ecological concern for the prevention of pollution or other contamination of potable water supplies. In pressurized flow system for drinking water, contamination of the potable water supply may occur by the undesired reverse flow into the system of previously discharged water which has become contaminated. This so-called "backflow" or "back-siphonage" may occur, for instance in the ordinary use of a conmon garden hose when discharged water remaining within the hose is drawn back into the potable water supply system by the creation of a vacuum in the supply line to which the hose is connected or, alternatively, when the terminal end of the hose is held at a higher elevation than the hose connection to the supply line from the potable water supply system simultaneously with a loss in the water supply pressure creating a greater fluid pressure downstream within the hose. Possible contamination of the potable water supply is particularly dangerous if the garden hose has been utilized for spraying toxic insecticides, fertilizers or like chemicals.

To prevent the above-described risk of water contamination, backflow preventing devices of a type commonly referred to as hose connection vacuum breakers have been developed for attachment to the discharge nozzle of conventional water faucets such as commonly provided on an exterior wall of a residential home for garden hose connection. Essentially, such backflow preventing devices provide a tubular body assembly with a threaded female-type inlet connection for mounting on the conventional threaded male-type outlet nozzle utilized on most conventional faucets and a threaded male-type outlet connection for attachment of a garden hose or similar flow conduit. A check valve assembly is provided in the passageway of the backflow preventing device between its inlet and outlet ends for permitting ordinary pressurized water flow from the inlet end to the outlet end while preventing reverse flow. some form of relief port in the body of the device permits any reversely flowing water to drain to the exterior of the body. Substantially all public water supply systems now require that appropriate backflow preventing devices such as these vacuum breakers be utilized in connecton with faucets and other discharge control valves connected in the system.

All known conventional hose connection vacuum breakers employ a multipiece tubular body which is relatively expensive to fabricate and assemble, as well as requiring proper sealing between the assembled pieces. Furthermore, conventional vacuum breaker devices provide a transverse wall separating the inlet and outlet end of the assembled body with multiple holes formed through the wall to provide inlet-to-outlet flow and the check valve operating against the separating wall to prevent reverse flow. Disadvantageously, the separating wall constricts the flow passageway through the vacuum breaker device and the holes formed in the wall are subject to clogging.

In contrast, the present invention provides an improved backflow preventing device, preferable of the hose connection vacuum breaker type, which is of a simplified one-piece body construction which eliminates the use of a separating wall to provide a more unobstructed flow passageway in the open operating condition of the device.

SUMMARY OF THE INVENTION

Briefly summarized, the backflow preventing device of the present invention includes a unitary tubular body which defines an unobstructed longitudinal flow passageway therethrough, the body having inlet and outlet connections at the opposite inlet and outlet ends of the passageway to facilitate connection of the device in line with flow conduit members in a fluid flow system. The body includes a shoulder formed interiorly of the passageway for constricting the passageway intermediate the inlet and outlet ends and the body defines a port arrangement opening from eth passageway upstream of the shoulder radially outwardly through the body. A valve assembly is positioned within the passageway and is resiliently biased for movement between a normal seated position which prevails under conditions of equalized fluid pressure at the inlet and outlet ends of the passageway or a relatively greater fluid pressure at the outlet end and an operating position which prevails under conditions of relatively greater fluid pressure at the inlet end of the passageway. In the normal seated position of the valve assembly, fluid communication is closed between th inlet end of the passageway and both the outlet end thereof and the port arrangement while communication is opened between the port arrangement and the passageway downstream of the valve assembly of exhausting any reverse fluid flow within the passageway. In the operating position of the valve assembly, the inlet and outlet ends of the passageway are in open communication while communication is closed between the passageway and the port arrangement for permitting normal fluid flow through the device from the inlet end to the outlet end of the passageway.

In the preferred embodiment, the body of the device includes an inlet tubular portion and an outlet tubular portion unitarily formed in end-to-end alignment, with the inlet tubular partion having a relatively larger exterior diametric dimension and defining a relatively larger interior cross-sectional area of the passageway than the outlet tubular portion. The end-to-end juncture of the inlet and outlet tubular portions interiorly forms the shoulder and a pair of recesses are formed at opposite sides of the body radially in the outer periphery of the inlet tubular portion at its juncture with the outlet tubular portion to open into the passageway in the region immediately upstream of the shoulder.

The valve assembly includes a resilient annular washer mounted to the inlet tubular portion of the body interiorly of the passageway upstream of the recesses. The washer is adapted to be flexibly deformed axially in the operating position of the valve assembly to sealingly engage the shoulder under the force of normal fluid pressure at the inlet end of the passageway to close communication between the passageway and the recesses. The valve assembly also includes a valve member positioned for longitudinal movement in the pasageway downstream of the washer. A biasing spring is provided for urging the valve member into sealing relation centrally with the downstream side of the washer in the normal seated position and for yielding to permit movement of the valve member away from the washer in the operating position for closing and opening, respectively, communication between the inlet and outlet ends of the passageway. Preferably, the valve memberhas axial flutes in its periphery for minimal restriction of fluid flow in the operating position of the valve assembly.

The inlet connection of the valve body preferably is of the female-type threaded interiorly of the passageway about the inlet end thereof to facilitate connection to a male-type threaded hose outlet. The outlet connection is of the male-type threaded exteriorly of the body about the outlet end of the passageway to facilitate connection to a female-type hose connection.

DESCRIPTION OF THE PREFERRED EMBODIMENT

Figure 1:
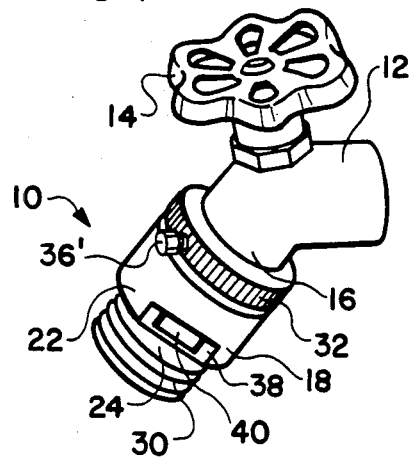
FIG. 1 is a perspective view of the hose connection vacuum breaker of the present invention as preferably installed on a conventional outdoor water faucet.

Referring now to the accompanying drawings and initially to FIG. 1, a hose connection vaccuum breaker backflow preventing device according to the present invention is generally indicated at 10 as preferably installed on the discharge nozzle 16 of a conventional water faucet 12 of the type typically used for outdoor access to a municipal or other potable water supply system. The faucet 12 includes an interior flow control valve (not shown) operated by a stem-mounted handle 14. The discharge nozzle 16 of the faucet 12 is exteriorly threaded to form a conventional male-type connection for mounting thereon of a conventional female-type interiorly-threaded fitting such as conventionally provided on one end of a common garden hose. Of course, as those persons skilled in the art will recognize, it will be understood that the present vacuum breaker 10 is equally adapted to be otherwise installed in varying manners in a pressurized fluid flow system for purposes of preventing reverse fluid flow therethrough.

Figure 2:
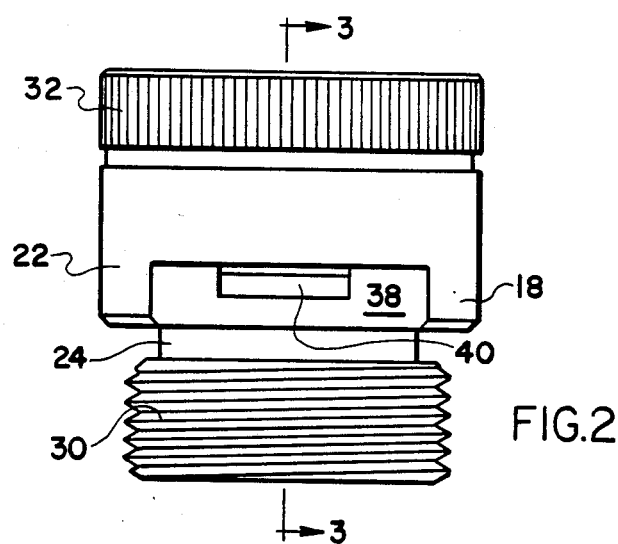
FIG. 2 is a front elevational view of the hose connection vacuum breaker of FIG. 1.
Figure 3:
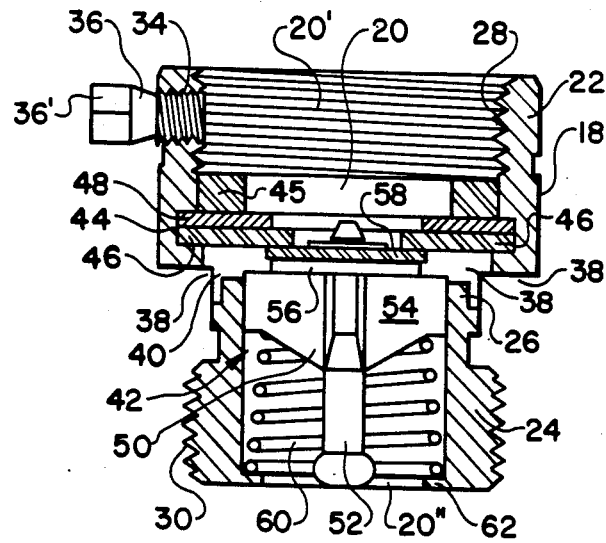
FIG. 3 is a vertical cross-sectional view of the hose connection vacuum breaker of FIG. 2 taken along line 3—3 thereof, showing the valve assembly in its normal seated position.
Figure 4:
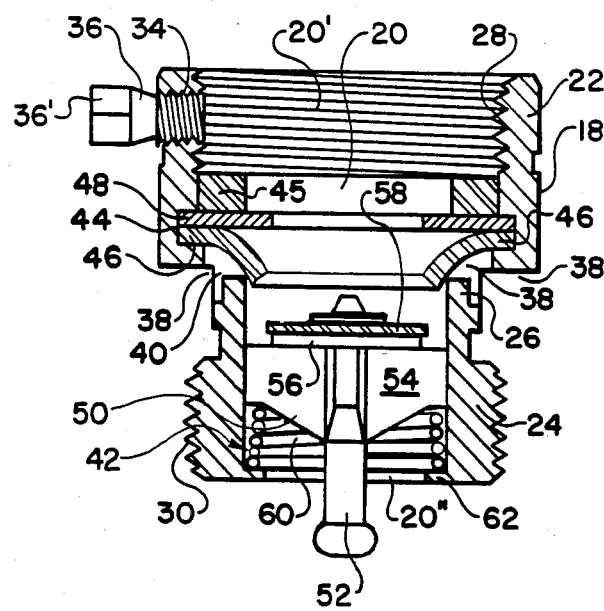
FIG. 4 is another vertical cross-sectional view of the hose connection vaacuum breaker similar to FIG. 3, showing the valve assembly in its operating position.

As best seen in FIGS. 2-4, the vacuum breaker 10 includes a tubular body 18 which defines an unobstructed longitudinal flow passageway 20 therethrough. The body 18 is unitarily formed in one integral piece including a cylindrical inlet tubular portion 22 and a cylindrical outlet tubular portion 24. The inlet tubular portion 22 is of a relatively larger exterior diametric dimension and defines a relatively larger interior cross-sectional area of the passageway 20 than the outlet tubular portion 24. The inlet and outlet tubular portions 22,24 are unitarily formed in end-to-end coaxial alignment with an integral annular shoulder portion 26 extending radially between the adjacent ends of the tubular portions 22,24. The inlet tubular portion 22 is threaded interiorly at 28 about the inlet end 20' of the passageway 20 to form a female-type hose connection to facilitate connection of the inlet tubular portion 22 to the faucet nozzle 16 or to another similar male-type fluid flow connection or fitting. The inlet tubular portion 22 is knurled exteriorly at 32 to facilitate manual tightening of the female connection 28 to the nozzle 16 or another mating male connection. A bore 34 is tapped radially through the inlet tubular portion 22 in the region of the female threads 28 and a set screw 36 of the type having a torque responsive break-away head 36' is fitted in the bore 34 for tightening into engagement with the nozzle 16 for permanent mounting of the inlet tubular portion 22 thereon. The outlet tubular portion 24 is threaded exteriorly at 30 about the outlet end 20" of the passageway 20 to form a male-type connection to facilitate connection thereto of the female-type end fitting of a garden hose or to another similar female-type fluid flow connection or fitting.

According to the present invention, the inlet tubular portion 22 of the body 18 has a pair of recesses 38 formed radially in the periphery of the inlet tubular portion 22 at diametrically opposed sides thereof at the juncture of the inlet tubular portion 22 with the outlet tubular portion 24, the recesses 38 being formed to a sufficient radial depth in the inlet tubular portion 22 to form radial exhaust ports 40 opening through the inlet tubular portion 22 into the passageway 20 in the region immediately upstream of the annular shoulder portion 26.

A valve assembly, indicated generally at 42, is positioned within the passageway 20 for controlling fluid communication from the inlet end 20' to the outlet end 20" of the passageway 20 and for also controlling fluid communication between the outlet end 20" of the passageway 20 and the exhaust ports 40, as hereinafter more fully explained. An annular groove 44 is formed in the interior wall surface of the inlet tubular portion 22 immediately upstream of the radial ports 40. The valve assembly 42 includes a resiliently flexible annular diaphragm or washer 46 seated in the annular groove 44 axially adjacent the ports 40 and a relatively inflexible annular retaining ring 48 also seated in the annular goove 44 axially upstream of the washer 46. An annular sealing washer 45 is frictionally fitted within the paassageway 20 and extends axially between the groove 44 in frictional sealing engagement with the retainer 48 to the female threaded area 28 for sealing engagement with the nozzle 16. The valve assembly 42 also includes a valve member 50 positioned within the passageway 20 downstream of the washer 46 for axial movement within the passageway 20 toward and away from the washer 46. The valve member 50 is of a fluted configuration having a longitudinal stem 52 which extends coaxially within the passageway 20 and four centering arms 54 extending radially outwardly from the upstream end of the stem 52 at equal circumferential spacings thereabout, axially fluted fluid flow areas being defined between the centering arms 54. A relatively inflexible retaining disk 56 and a relatively flexible sealing disk 58 are mounted on the upstream side of the centering arms 54 coaxially about the stem 52 for sealing engagement of the sealing disk 58 with the washer 46 to close the central open area therethrough. A coil spring 60 is positioned coaxially within the passageway 20 dowstream of the valve member 50 to extend between the downstream side of the centering arms 54 and a flange portion 62 which extends from the outlet tubular portion 24 radially inwardly of the passageway 20 at its outlet end 20".

In this manner, the spring 60 urges the valve member 50 longitudinally within the passageway 20 in an upstream direction into a normal seated position shown in FIG. 3 wherein the sealing disk 58 is sealingly seated in coaxial engagement with the downstream side of the washer 46 to close the central axial opening through the washer 46 and the retainer 48 to prevent fluid communication between the inlet and outlet ends 20′,20″ of the passageway 20. The spring 60 is yieldable as shown in FIG. 4 to permit longitudinal movement of the valve member 50 within the passageway 20 in a downsteam direction to separate the sealing disk 58 from the washer 46 to open fluid communication between the inlet and outlet ends 20′,20″ of the passageway 20 through the central axial openings in the washer 46 and the retainer 48, peripherally about the retaining and sealing disks 56,58 and through the axially fluted areas between the centering arms 54 of the valve member 50.

In operation, the spring 60 maintains the valve member 50 in its normal seated position shown in FIG. 3 under conditions of equalized fluid pressure at the inlet and outlet ends of the passageway 20 or under conditions of relatively greater fluid pressure at the outlet end of the passageway 20 for closing communication between the inlet end 20° of the passageway 20 and both the outlet end 20″ thereof and the ports 40 to prevent any reverse fluid flow within the passageway 20 from re-entering the nozzle 16 and flowing back into the potable water supply. At the same time, the normal seated position of the valve member 50 opens communication between the outlet end 20″ of the passageway 20 and the ports 40 for exhausting and draining from the vacuum breaker 10 any such reverse fluid flow re-entering the passageway 20. Under conditions of relatively greater fluid pressure at the inlet end 20′ of the passageway 20, such as would occur when the handle 14 to the faucet 12 is opened to discharge water under pressure from the water supply system, the prevailing fluid pressure causes movement of the valve member 50 to its operating position of FIG. 4 to open communication between the inlet end 20′ and the outlet end 20″ of the passageway 20 for normal fluid flow therethrough. At the same time, the prevailing upstream fluid pressure and the force of the water flowing through the passageway 20 flexibly deforms the radially inward annular portion of the washer 46 axially in the downstream direction of water flow to cause the washer 46 to sealingly engage the shoulder portion 26 to close communication between the passageway 20 and the ports 40 to prevent leakage of the moving stream of water outwardly through the ports 40.

The one-piece unitary construction of the body 18 provides significant savings in materials and fabrication costs by enabling the body 18 to be produced from a single unitary piece of a suitable length of conventional cylindrical metal rod stock, e.g. brass rod. Accordingly, in contrast to conventional hose connection vacuum breakers utilizing two piece bodies, a significantly lower capital investment for tooling and a significantly shorter fabrication time with correspondingly lesser attendant labor costs are required for fabrication of the present vaccum breaker device. Furthermore, the present vacuum breaker's unitary one-piece body construction in conjunction with the radially-formed exhaust ports and the particular valve assembly eliminate the need for any transverse dividing wall within the fluid passageway such as is utilized in conventional two-piece vacuum breaker constructions and accordingly, provide the present vacuum breaker with a considerably more unobstructed fluid flow path through the device in the open operating position of the valve assembly. The axially fluted configuration of the valve member 50 advantageously contributes to minimize the restriction of fluid flow through the passageway 20 in the operating position of the valve assembly.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

I claim:

1. A hose connection-type vacuum breaker device adapted to be installed on the discharge side of a pressurized fluid control valve for preventing reverse return flow of discharged fluid through the control valve under a relative vacuum condition on the supply side of the control valve, said vacuum breaker device comprising a solidary one-piece tubular body having an inlet tubular portion and an outlet tubular portion unitarily formed in end-to-end alignment and defining an unobstructed longitudinal flow passageway therethrough, said inlet tubular portion having a relatively larger exterior diametric dimension and defining a relatively larger interior cross-sectional area of said passageway than said outlet tubular portion with the end-to-end juncture of said inlet and outlet tubular portions forming shoulder means interiorly of said passageway for constricting said passageway intermediate said inlet and outlet tubular portions, said body having female connection means threaded interiorly of said passageway within said inlet tubular portion to facilitate connection to a male-type threaded hose connection and having male connection means threaded exteriorly of said body about said outlet tubular portion to facilitate connection to a female-type hose connection, said body having a pair of recesses formed radially in the outer periphery of said inlet tubular portion at the juncture thereof with said outlet tubular portion at opposite sides of said body to sufficient depth to open into said passageway in the region immediately upstream of said shoulder means for forming ports opening from said passageway upstream of said shoulder means radially outwardly through said body, and valve means positioned within said passageway, said valve means being resiliently biased for movement between a normal seated position under conditions of equalized fluid pressure at said inlet and outlet ends and relatively greater fluid pressure at said outlet end for closing communication between said inlet end and both said outlet end and said ports while opening communication between said ports and said passageway downstream of said valve means for exhausting any reverse fluid flow within said passageway and an operating position under conditions of relatively greater fluid pressure at said inlet end for opening communication between said inlet end and said oulet end while closing communication between said passageway and said ports for normal fluid flow from said inlet end to said outlet end of said passageway.

2. A hose connection-type vacuum breaker device according to claim 1 and characterized further in that said valve means includes resilient annular washer means mounted to said body interiorly of said passageway upstream of said port means and adapted to be flexibly deformed axially in said operating position of said valve means to sealingly engage said shoulder means under the force of normal fluid pressure at the inlet end of said passageway to close communication between said passageway and said port means.

3. A hose connection-type vacuum breaker device according to claim 2 and characterized fruther in that said valve means includes a valve member positioned for longitudinal movement in said passageway downstream of said washer means and spring biasing means for urging said valve member into sealing relation centrally with the downstream side of said washer means in said normal seated position and for yielding to permit movement of said valve member away from said washer means in said operating position for closing and opening, respectively, communication between said inlet and outlet ends of said passageway.

4. A hose connection-type vacuum breaker device according to claim 3 and characterized further in that said valve member has axial flutes in its periphery for minimal restriction of fluid flow in said operating position.

* * * * *

UNITED STATES PATENT OFFICE
CERTIFICATE OF CORRECTION

Patent No. 4,669,497 Dated June 2, 1987

Inventor(s) Edwin L. Tenhengel

It is certified that error appears in the above-identified patent and that said Letters Patent are hereby corrected as shown below:

Col. 2, Line 22, delete "eth" and insert therefor — the — .
Col. 2, Line 33, delete "th" and insert therefor — the — .
Col. 2, Line 37, delete "of" and insert therefor — for — .
Col. 2, Line 47, delete "partion" and insert therefor — portion — .
Col. 2, Line 66, delete "pasageway" and insert therefor — passageway — .
Col. 3, Line 6, delete "memberhas" and insert therefor — member has — .
Col. 4, Line 64, delete "dowstream" and insert therefor — downstream — .
Col. 5, Line 25, delete "20°" and insert therefor — 20' — .

Signed and Sealed this

Nineteenth Day of July, 1988

Attest:

DONALD J. QUIGG

Attesting Officer     Commissioner of Patents and Trademarks